March 18, 1947. P. E. FLETCHER 2,417,746
SLOT INSULATION
Filed April 26, 1944

WITNESSES:
C. J. Weller.
T. Shapoe

INVENTOR
Paul E. Fletcher.
BY
ATTORNEY

Patented Mar. 18, 1947

2,417,746

UNITED STATES PATENT OFFICE 2,417,746

SLOT INSULATION

Paul E. Fletcher, Lima, Ohio, assignor to Westinghouse Electric Corporation, East Pittsburgh, Pa., a corporation of Pennsylvania Application April 26, 1944, Serial No. 532,905

1 Claim. (Cl. 171—206)

This invention relates to electrical insulation, and more particularly electrical insulation suitable for use in dynamo-electric apparatus, especially for the slot cells thereof.

In order to provide for a greater electrical capacity in a dynamo-electric machine, it is desirable to employ as the electrical insulation thereof materials that will withstand higher temperatures than ordinary organic materials, such as paper or cellulose derivatives. It is particularly desirable to provide insulation in such apparatus that is capable of withstanding heavy overloading for brief periods of time without causing deterioration and failure of such insulation. The factor that contributes to the failure of electrical insulation while in use in the apparatus as much as or perhaps more than any other factor, is the temperature of the apparatus. By present insulation standards organic insulation, such as paper or cotton, is considered unsafe if the temperatures are kept above 105° C. for prolonged periods of time.

To provide for longer life and better heat resistance, insulation for dynamo-electrical apparatus is often prepared with a predominant amount of inorganic materials, such as mica flakes, asbestos fabric, glass fabric, and the like. Resinous binders and impregnants for these inorganic solid insulation materials have been developed to the point where they are more heat resistant than paper, for example. Apparatus embodying such inorganic insulating material is capable of operating at much higher temperatures than all organic insulation and is particularly suitable for use under fluctuating loads where normally excessive overloads occur at frequent intervals.

In building dynamo-electric apparatus, the inorganic insulating materials are applied thereto in various form and shapes. Unfortunately, glass fabric, asbestos fabric and mica flakes or any combination thereof, do not produce material of great stiffness with good tear resistance and abrasion resistance. For example, mica flakes, when formed into thin sheets by applying thereto a resinous binder, are somewhat fragile and if inserted into slots the mica flakes may be rubbed off, or delaminated and the material deformed. Glass fabric forms a limp product when impregnated with resins and is not entirely satisfactory for rapid manufacturing processes.

The object of this invention is to provide bonded insulation composed of glass cloth, mica flakes and a stiff, chemically treated cellulose sheet, and the whole impregnated with a resinous binder.

A further object of the invention is to provide insulation suitable for use in slot cells, the insulation embodying mica flakes and glass cloth in combination with stiffening means to provide for efficient application to dynamo-electric machines.

Other obejcts of the invention will, in part, be obvious and will, in part, appear hereinafter.

For a fuller understanding of the nature and objects of the invention, reference should be had to the following figures of the drawing, in which Figure 1 is a greatly enlarged fragmentary cross section of one form of insulation embodying the invention;

Figure 1:
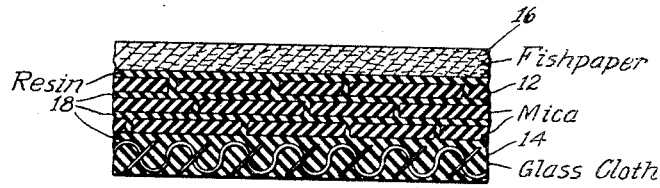

According to the present invention, electrical insulation is produced by applying to each side of a layer of mica flakes a protective sheet material to provide for maintaining the mica flakes in their most efficient and undisturbed form. At least one of the protective sheets of material is composed of glass cloth which is characterized by tear resistance. At least one sheet of stiff chemically treated cellulosic material, such, for example, as fishpaper, is applied to one side of a layer of mica flakes to impart stiffness, tear resistance and abrasion resistance to the combined insulation. The entire insulating combination is bonded with a resinous binder.

The mica flakes may be formed into a layer or sheet in various ways. The thinnest form of mica insulation is ordinarily produced manually by laying flakes of mica in overlapping fashion until a layer of two or three or more thicknesses is produced. A solution of a selected resinous binder is applied thereto which, upon drying, produces a resinous deposit between the layers of mica flakes bonding them into a unitary sheet. Where thicker sheets of mica flakes are acceptable, the mica flakes may be produced on a conventional mica-laying machine to a layer thickness of from 5 mils to 20 mils. A binder is applied thereto in solution and dried to provide a workable sheet.

In some cases, the glass cloth and mica flakes may be combined during the process of producing the layer of mica flakes. In this instance, the mica flakes are laid or deposited directly on the layer of fabric woven or otherwise produced from glass fibers. The resinous binder with which the mica flakes are impregnated or bonded will likewise impregnate and fill the interstices between the glass fibers and bond the glass fabric to the mica flakes.

In most cases, however, the mica flakes bonded into a separate layer by means of a resinous binder are applied to glass fabric that may have been previously impregnated with a binder or varnish to form an impervious sheet and the two united by applying thereto additional binder or by pressing while heating to cause softening of the resin and consequent bonding. Where the glass fabric has not been treated with a resin, a solution of resinous material in a solvent is applied to the combined glass fabric and mica flake layer so that upon removal of the solvent a unified structure is produced.

For the purpose of this invention, it is most desirable to employ glass fabrics produced from extremely fine glass fibers of an average diameter of 0.002 of an inch or less. Commercially, glass fibers of a diameter of 0.00025 inch and finer are available. These fibers are quite flexible and possess great strength. The glass fibers may either be of the continuous filament type where great strength is desired, or they may consist of a plurality of staple fibers spun and twisted into threads. The threads may be woven in any desirable manner into a fabric. In some cases, braiding or knitting may be employed to produce a sheet fabric from the glass fibers. Where thickness is not at a premium, thin felted fabric may be made use of in producing the insulation of the present invention.

Fishpaper is particularly desirable as the stiffening sheet means employed in the combination of the instant invention. Fishpaper is produced from a rag base material treated with zinc chloride until a chemical conversion of the cellulose structure has been effected. Removal of the zinc chloride and calendering results in a dense, stiff and extremely useful electrical insulating material. Equivalents of fishpaper, such, for example, as vulcanized fiber, high density rag paper and parchmentized paper may be employed for the same purpose. The chemical treatment imparts some improvement in heat resistance to the cellulose.

Referring to Fig. 1 of the drawing, there is illustrated the insulating material 10 consisting of a plurality of flakes of mica 12 supported on one side by the sheet of glass cloth 14 and on the other side is applied to impregnate the glass cloth 14, mica flakes 12, the fishpaper 16 and to bond the whole into a unitary material that can be cut and shaped and formed without delamination.

Figure 2:
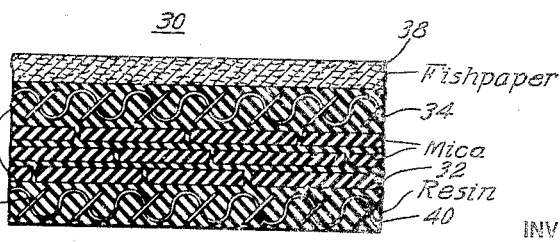
Fig. 2 is a greatly enlarged fragmentary cross sectional view of a different embodiment of the invention.

Fig. 2 shows a modified form of invention that may be desirable in certain cases. The insulating material 30 consists of a layer of mica flakes 32 with sheets of glass cloth 34 and 36 applied to both sides of the mica flakes and a sheet of fishpaper 38 applied externally to one side of the glass cloth 34. The resin 40 impregnates and bonds the mica flakes and the sheets into a whole.

Resinous binders which may be employed for the impregnation and bonding of the several sheets of material and mica flakes include various mica bonding agents, such as shellac; polyisobutylene of a molecular weight of from 3000 to 20,000; polyhydric alcohol—polybasic acid resins, such, for example, as pentaerythritol—maleate phthalate, glycolmaleate - phthalate - styrene resins; and similar organic resins. For higher temperature service, the silicones are suggested as desirable bonding agents. Suitable silicones are the phenyl ethyl silicones, methyl silicones and other organic silicone materials. The resins are most conveniently applied by dissolving in suitable solvents and spraying, brushing or dripping the solution upon the mica flakes, glass cloth, and fishpaper. Upon drying, the resin will be deposited in the materials and function as a satisfactory binder. In some cases, after drying, the composite sheets may be subjected to high temperatures under pressure to cause fusion and flow of the resin whereby a more uniform distribution of the binder, and a high degree of consolidation and smoothing of the composite material takes place.

The glass fabric has been found to be beneficially affected when impregnated with a vinyl composition such as polyvinyl acetate or partially hydrolyzed polyvinyl acetate. The tear resistance of the glass cloth is increased considerably by such treatment. The glass cloth, therefore, can be separately impregnated with one of the polyvinyl compounds prior to consolidating the whole. In other cases a modified phenol-aldehyde varnish or drying oil varnish may be applied to the glass fabric.

The composite sheet insulation of Figs. 1 or 2, for example, may be cut or punched with cleancut edges. Very little loss or waste of the mica flakes or other material due to cutting occurs. The insulation may be then formed, either by cold or hot pressing, into various shapes for predetermined use.

Figure 3:
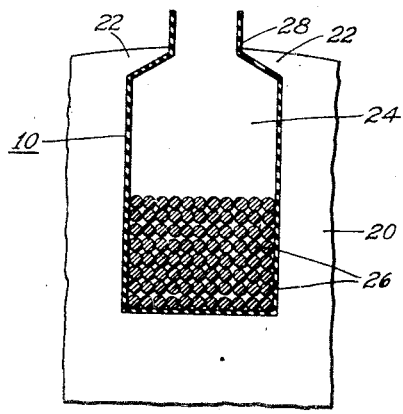
Fig. 3 is a fragmentary cross section illustrating the use of the insulation of the invention.
Figure 4:
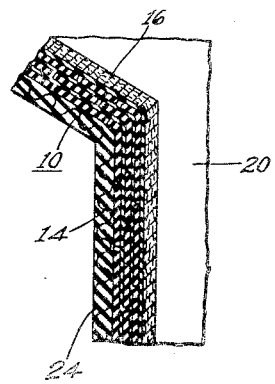
Fig. 4 is a magnified cross sectional view of a portion of the structure of Fig. 3.

A particularly advantageous application for the material of this invention is as a slot-cell liner, as illustrated in Fig. 3. The slot-cell liner 10 is easily inserted into the slot 24 in the magnetic material 20 of a dynamoelectric machine by compressing the tabs 28 and sliding the liner endwise into the cell. As shown in enlarged detail in Fig. 4, the fishpaper side 16 of the insulating material is applied in contact with the magnetic material 20 in which the slot 24 is formed. The fishpaper is resistant to tearing and abrasion to a much greater degree than the glass fabric or other insulating materials. During long continued operation, the fishpaper will withstand vibration in contact with any ragged burrs or projections produced in making the slot 24, and during winding functions as a cushion for the mica and glass fabric.

The glass fabric 14 of the cell liner 10 comes in contact with the insulated conductors 26 deposited in the cell. The glass fabric has adequate usefulness to withstand the operation of laying in the conductor as well as the tamping of the conductors to assure a good solid coil. After the slot cell has been filled with the coils, the tabs 28 of the cell are folded over the coil underneath the projections 22 of the core. When so folded, the fishpaper layer 16 is uppermost. The slot wedges may be driven in much more efficiently and safely since the slick and tear resistant surface of the fishpaper will not tend to be caught by the slot wedge. A tight coil within each cell is produced by the construction herein disclosed.

In some cases, it may be desirable to put an extremely thin layer of fishpaper of several mils thickness at the interior surface of the slot-cell liner to facilitate the laying of electrical conductor with automatic coil winding machines.

The fishpaper assists in the attainment of good production in making of dynamo-electric machines since it gives resiliency to the slot-cell liner causing it to spring back firmly against the slot-cell walls when properly formed. Thus it will not tend to obstruct insertion of coils when building of the machine as occurs with limp slot cells. A mica and glass cloth slot-cell material lacks this resilient quality and the slot-cell liner may close or even be caught by the conductor being inserted into the slot.

The adhesion of the glass cloth, mica flakes and fishpaper is excellent and the material will not delaminate even if the slot cell is crowded or caught while the electrical conductors are being inserted.

Numerous other advantages of the invention disclosed will be apparent. The material may be employed for numerous other electrical applications, for example, in making coil forms and various other insulating members.

Good results have been obtained from the combination of materials without a bulky insulation being required. The construction shown in Fig. 1 has been produced in an overall thickness of 15 mils while the Fig. 2 form of the invention has been produced with an overall thickness of 17 mils.

Since certain changes in carrying out the above invention and certain modifications in the insulating members which embody the invention may be made without departing from the scope thereof, it is intended that all matter contained in the above description shall be interpreted as illustrative and not in a limiting sense.

I claim as my invention:

A slot-cell liner comprising, in combination, a length of insulating material folded into an open topped configuration, the open top providing for receiving electrical conductors, the insulating material so formed that the slot-cell liner has a smooth, abrasion and tear resistant exterior, composed of a cellulosic sheet of the nature of fishpaper, a layer of mica flakes disposed inside the fishpaper, and glass cloth forming the interior of the cell liner for coming into contact with the electrical conductors, and a resinous binder impregnating and bonding the insulating material.

PAUL E. FLETCHER.

REFERENCES CITED

The following references are of record in the file of this patent:

UNITED STATES PATENTS

| Number | Name | Date |
| --- | --- | --- |
| 2,320,866 | Hill | June 1, 1943 |
| 1,486,874 | Frederick | Mar. 18, 1924 |
| 1,758,867 | Tarr | May 13, 1930 |
| 2,202,820 | Baird et al. | June 4, 1940 |

FOREIGN PATENTS

| Number | Country | Date |
| --- | --- | --- |
| 530,369 | British | Dec. 11, 1940 |